No. 793,112. PATENTED JUNE 27, 1905.
R. V. WAGNER.
VACUUM TUBE.
APPLICATION FILED OCT. 6, 1903. RENEWED NOV. 28, 1904.

Witnesses
Chas. K. Davies.
M. E. Brown.

Inventor
R. V. Wagner
by W. H. Bartlett
Attorney.

No. 793,112.       Patented June 27, 1905.

UNITED STATES PATENT OFFICE.

ROME V. WAGNER, OF CHICAGO, ILLINOIS.

VACUUM-TUBE.

SPECIFICATION forming part of Letters Patent No. 793,112, dated June 27, 1905.

Application filed October 6, 1903. Renewed November 28, 1904. Serial No. 234,646.

*To all whom it may concern:*

Be it known that I, ROME V. WAGNER, a citizen of the United States, residing at Chicago, in the county of Cook and State of Illinois, have invented certain new and useful Improvements in Vacuum-Tubes, of which the following is a specification.

This invention relates to so-called "vacuum-tubes," such as are used in X-ray work.

The object of the invention is to adjust the electrodes and to control the distance between the anode and the cathode of such instruments without danger of permitting the entrance of air into the tube.

The invention consists in a tube of the character described with one of the electrodes adjustable with relation to the other and to the tube by means of a magnet which can be manipulated from outside the vacuum-tube.

Figure 1:
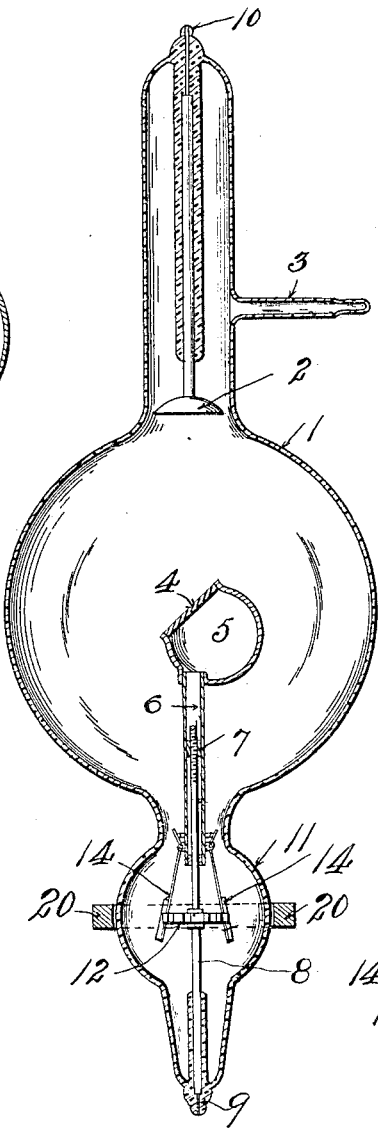
Figure 2:
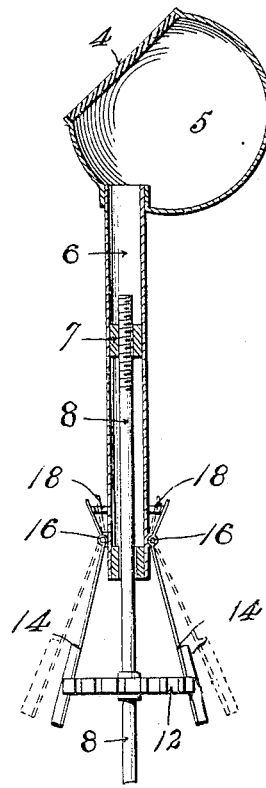
Figure 3:
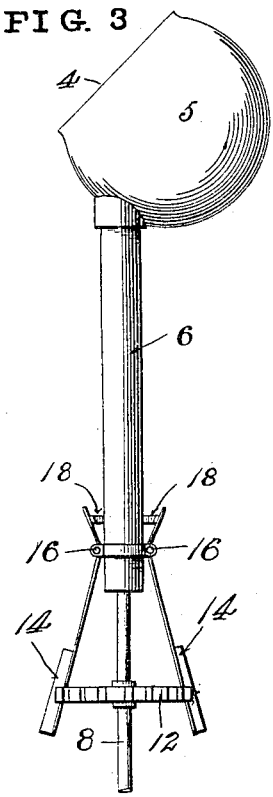
Figure 4:
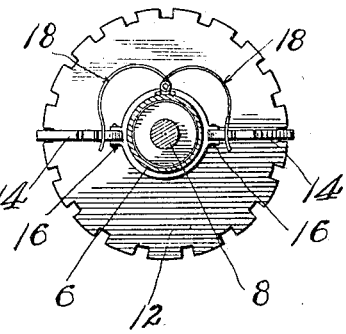

Figure 1 is a longitudinal section of a vacuum-tube, showing also a section of a magnet by which the movable electrode (in this case the anode) is moved. Fig. 2 is an enlarged longitudinal section of the anode and its supporting-stem. Fig. 3 is a side elevation of the parts shown in Fig. 2. Fig. 4 is a cross-section of the spindle which supports the anode and its attachments.

Heretofore in vacuum-tubes of ordinary construction the electrodes have been fixed in position before the air was exhausted from the tube. As the tube cannot be tested until the air is exhausted, it often happened that the electrodes were not adjusted or "focused" to the proper distance apart. Some attempt has been made to adjust one of the electrodes by the action of gravity and a frictional holding device; but this has not usually been satisfactory, as the adjustment was uncertain.

I illustrate one preferred mode of construction of my invention. Any skilled mechanic will be able to readily adapt the principles of my invention to other forms of tubes, electrodes, and adjusting devices.

Let 1 indicate a vacuum-tube of glass of any usual form. In this the cathode 2 is held in any usual relation to the body of the tube, the form shown being a common one wherein the exhaust-tube 3 is attached to a cylindrical extension of the tube and is sealed after the tube is exhausted.

The anode 4 is supported in a holding-cup 5, and this is attached to a metallic stem 6, which stem is hollow and has an internal screw thread or nut 7. Electrical connection to the anode is made through the metallic post 8, which connects with the platinum conductor 9. The platinum conductors 9 and 10 are sealed in the glass stems of the tube in usual manner. Post 8 is screw-threaded where it passes through nut 7. Thus it will be seen that the rotation of stem 6 will cause the stem 6 to advance or recede along the post 8 by means of the screw-and-nut connection.

To the outside of post 8 I firmly attach a notched disk or holder 12. To the stem 6 or to collar 16 thereon I hinge two armatures 14, (in the form shown in the example.) These armatures are pressed toward the post 8 by light springs 18. The armatures and holder are preferably inclosed in a bulb or enlargement 11 of the body of the tube, although the form of this inclosure is not thought to be material. The free ends of the armatures 14 under pressure of the springs 18 drop into notches of the disk or holder 12, forming a clutch, and so retain the stem and anode in adjusted position. When it is desirable to change this position, a magnet 20 is placed in proximity to the bulb 11 and the armatures are attracted and drawn out of the notches in disk 12. Then by rotating the magnet about the bulb 11 the armatures and the stem to which they are attached are caused to rotate by means of the magnetic attraction of the magnet on the armatures, and the stem 6 and its supported anode may be adjusted nearer to or farther from the cathode. On removing the magnets the armatures are pressed by their springs into place against the disk 12 and the anode is held in its new position.

I might describe other mechanism which I have devised and consider the equivalent of that set forth; but I consider such elaboration unnecessary and desire it to be understood that the scope of my invention is in my opinion as broad as the claims herein.

One of the advantages of my adjustment is that I am able not only to adjust the electrodes to a proper focus, but also to turn the anode to face any side of the tube. This becomes highly important when it is considered that particles of metal from the electrode, generally the cathode, often become attached to the inside of the tube, especially on the side from which the "ray" extends. By turning the anode a different surface of the glass is used and the effective life of the tube prolonged.

What I claim is—

1. Inclosed in a vacuum-tube, the combination of a movable electrode, a hollow screw-threaded stem supporting the same, a threaded post on which said stem is screwed, an armature connected to said stem, and an armature-holder connected to the post.

2. A vacuum-tube having a rotatable anode therein, means for adjusting the anode circumferentially, and means for positively holding the anode in adjusted position.

3. In a vacuum-tube, the combination of a fixed cathode, an adjustable anode, means for moving said anode by the application of a magnet outside the tube, and mechanical means within the tube for retaining the anode positively in adjusted position.

4. In a vacuum-tube, the combination of a fixed cathode, an anode supported on a screw-threaded post, an armature connected to the anode, a holder for said armature, and a spring bearing the armature against the holder.

In testimony whereof I affix my signature in presence of two witnesses.

ROME V. WAGNER.

Witnesses:
W. A. BARTLETT,
M. E. BROWN.